(12) United States Patent
Chen et al.

(10) Patent No.: US 11,455,046 B2
(45) Date of Patent: Sep. 27, 2022

(54) ELECTRONIC DEVICE

(71) Applicant: ASUSTeK COMPUTER INC., Taipei (TW)

(72) Inventors: Ya-Ting Chen, Taipei (TW); Hung-Yi Lin, Taipei (TW); Chien-Chih Tseng, Taipei (TW); Chun-Tsai Yeh, Taipei (TW); Wei-Tong Lin, Taipei (TW); Ming-Chieh Chen, Taipei (TW); Yi-Ou Wang, Taipei (TW); Chao-Chieh Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/313,237

(22) Filed: May 6, 2021

(65) Prior Publication Data

US 2021/0357039 A1    Nov. 18, 2021

(30) Foreign Application Priority Data

May 12, 2020 (TW) ................................. 109115782

(51) Int. Cl.
*G06F 3/038* (2013.01)
*G06F 3/0354* (2013.01)

(52) U.S. Cl.
CPC .......... *G06F 3/038* (2013.01); *G06F 3/03545* (2013.01)

(58) Field of Classification Search
CPC ............................. G06F 3/038; G06F 3/03545
See application file for complete search history.

(56) References Cited

U.S. PATENT DOCUMENTS

| 9,317,144 | B2 | 4/2016 | Mao et al. |
| 2013/0271395 | A1 | 10/2013 | Tsai et al. |
| 2016/0103496 | A1 | 4/2016 | Degner et al. |
| 2019/0094998 | A1* | 3/2019 | Chin ....................... G06F 3/041 |
| 2019/0295498 | A1* | 9/2019 | Lee .......................... G09G 5/14 |
| 2021/0034230 | A1* | 2/2021 | Zank ..................... G06F 3/0488 |

FOREIGN PATENT DOCUMENTS

| CN | 205485928 U | 8/2016 |
| CN | 106484125 A | 3/2017 |
| TW | 201342191 A | 10/2013 |
| TW | 201426513 A | 7/2014 |

* cited by examiner

*Primary Examiner* — Peter D McLoone
(74) *Attorney, Agent, or Firm* — McClure, Qualey & Rodack, LLP

(57) ABSTRACT

An electronic device suitable for a stylus is provided. The electronic device includes a display panel, a touch module, and a processor. The display panel includes a display area. The touch module includes a touchable area. The processor is electrically connected to the display panel and the touch module. The processor defines an effective input area in the touchable area in response to the operation of the stylus, defines a mapping display area in the display area corresponding to the effective input area, and adjusts the display ratio of the mapping display area according to the input ratio of the effective input area.

14 Claims, 9 Drawing Sheets

ELECTRONIC DEVICE

CROSS-REFERENCE TO RELATED APPLICATION

This application claims the priority benefit of Taiwan applications serial No. 109115782, filed on May 12, 2020. The entirety of the above-mentioned patent application is hereby incorporated by reference herein and made a part of specification.

BACKGROUND OF THE INVENTION

Field of the Invention

The invention relates to an electronic device with a stylus.

Description of the Related Art

As notebook computers becomes more and more popular, the fixed operating space of traditional touchpads is increasingly unable to meet the needs of users. Therefore, large-size touchpads form a new trend, and meanwhile, more diverse input methods are also provided by supporting the use of writing functions and stylus.

When a stylus draws or writes on the touchpad supporting the writing function, the traces are synchronously mapped on a screen. However, when the input ratio of the touchpad is inconsistent with the display ratio of the screen, the actual output image on the screen is proportionally distorted, which makes users feel uncomfortable.

BRIEF SUMMARY OF THE INVENTION

According to an aspect of the disclosure, an electronic device adapted with a stylus is provided. The electronic device includes: a display panel, including a display area; a touch module, including a touchable area; and a processor, electrically connected to the display panel and the touch module, the processor defines an effective input area responding to the operation of the stylus in the touchable area, and defines a mapping display area corresponding to the effective input area in the display area, and adjusts a display ratio of the mapping display area according to an input ratio of the effective input area.

Consequently, in this disclosure, the optimal mapping relationship between the touch module and the display panel is established and adjusted according to the needs of users, and the size and position of the effective input area of the stylus in the touchable area of the touch module is customized, to solve the problem of proportional distortion, so that users will not feel uncomfortable.

These and other features, aspects and advantages of the present invention will become better understood with regard to the following description, appended claims, and accompanying drawings.

DETAILED DESCRIPTION OF THE EMBODIMENTS

Figure 1:
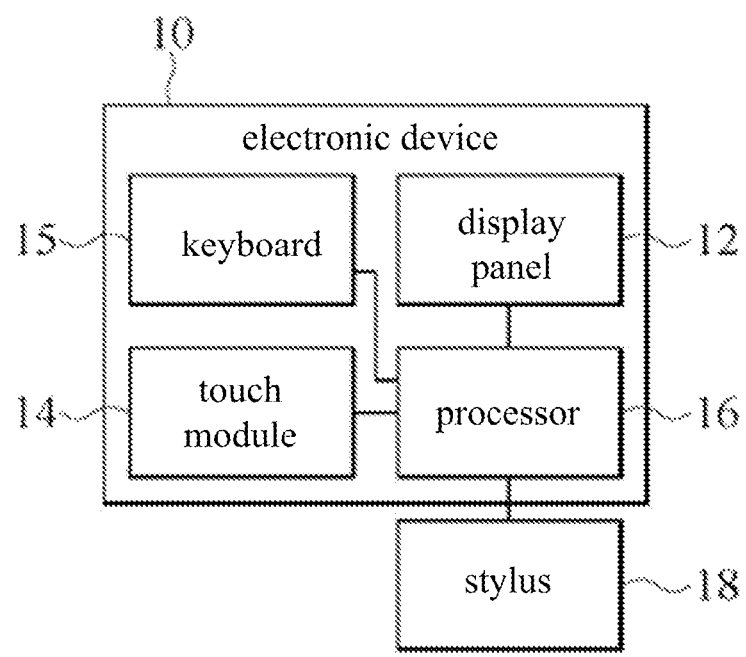
FIG. 1 is a block diagram of an electronic device according to an embodiment.
Figure 2:
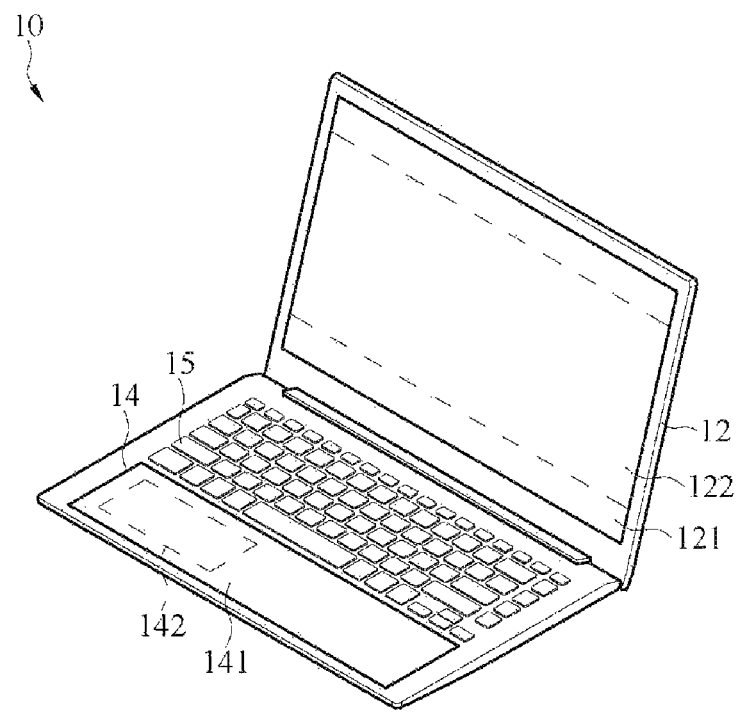
FIG. 2 is a schematic diagram of a display state of an electronic device according to an embodiment.

FIG. 1 is a block diagram of an electronic device according to an embodiment. FIG. 2 is a schematic diagram of a display state of an electronic device according to an embodiment. Please refer to FIG. 1 and FIG. 2. An electronic device 10 is adapted with a stylus 18. The electronic device 10 includes a display panel 12, a touch module 14, a keyboard 15 and a processor 16. In one embodiment, the display panel 12 includes a display area 121, the touch module 14 is a touchpad with a touchable area 141, and the processor 16 is electrically connected to the display panel 12, the touch module 14 and the keyboard 15. The processor 16 defines an effective input area 142 for the operation of the stylus 18 in the touchable area 141 and defines a mapping display area 122 in the display area 121 corresponding to the effective input area 142. Furthermore, the processor 16 correspondingly adjusts the display ratio of the mapping display area 122 (that is, the aspect ratio of the mapping display area 122) according to the input ratio of the effective input area 142 (that is, the aspect ratio of the effective input area 142), to make the input ratio of the effective input area 142 equal to the display ratio of the mapping display area 122. In one embodiment, as the display ratio is equal to the input ratio, when the stylus 18 writes or draws in the effective input area 142, the processor 16 displays the input content on the mapping display area 122 in an equal proportion without distortion. In one embodiment, the electronic device 10 is a notebook computer, and the touch module 14 is a touch pad, or a touch screen or any input module that supports writing input, which is not limited herein.

In one embodiment, the display panel 12 of the electronic device 10 and the processor 16 are integrated into the same body structure, such as a notebook computer. In another embodiment, the electronic device 10 includes a first body with the display panel 12 and a second body with the processor 16. The first body and the second body are independent. The first body can be detached from the second body.

Figure 3:
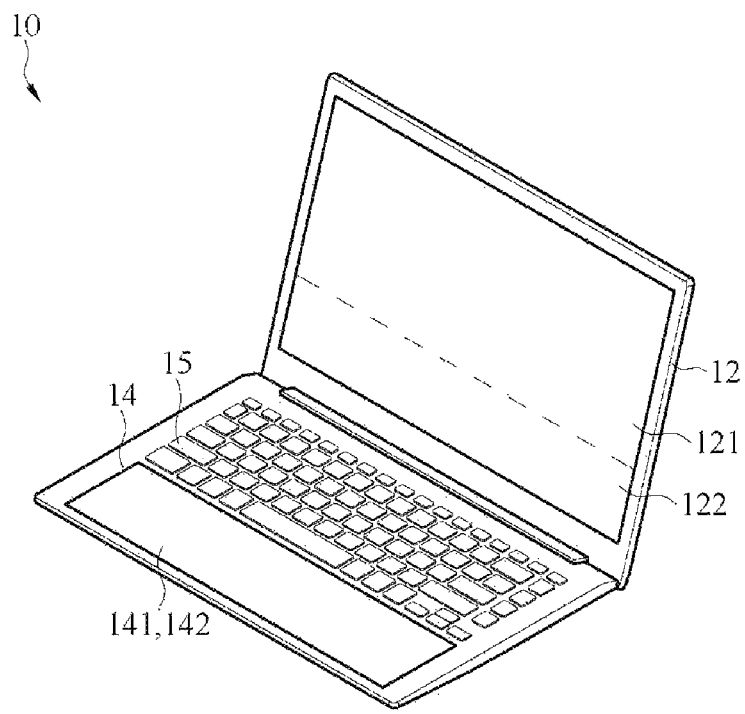
FIG. 3 is a schematic diagram of an original display state of the electronic device according to an embodiment.

As shown in FIG. 1 and FIG. 3, in one embodiment, when the electronic device 10 loads the application program of the stylus 18, the processor 16 generates a switching command to the stylus 18. When the stylus 18 receives the switching command from the processor 16, the stylus 18 adjusts the coordinate range of operation coordinate information from a first coordinate range corresponding to the entire display area 121 to a second coordinate range corresponding to the mapping display area 122, and the mapping display area 122 is proportional to the effective input area 142 (the effective input area 142 is equivalent to the touchable area 141 in this embodiment). At this time, the mapping display area 122 is adjusted from the same size as the entire display area 121 to the same ratio as the effective input area 142.

Figure 4:
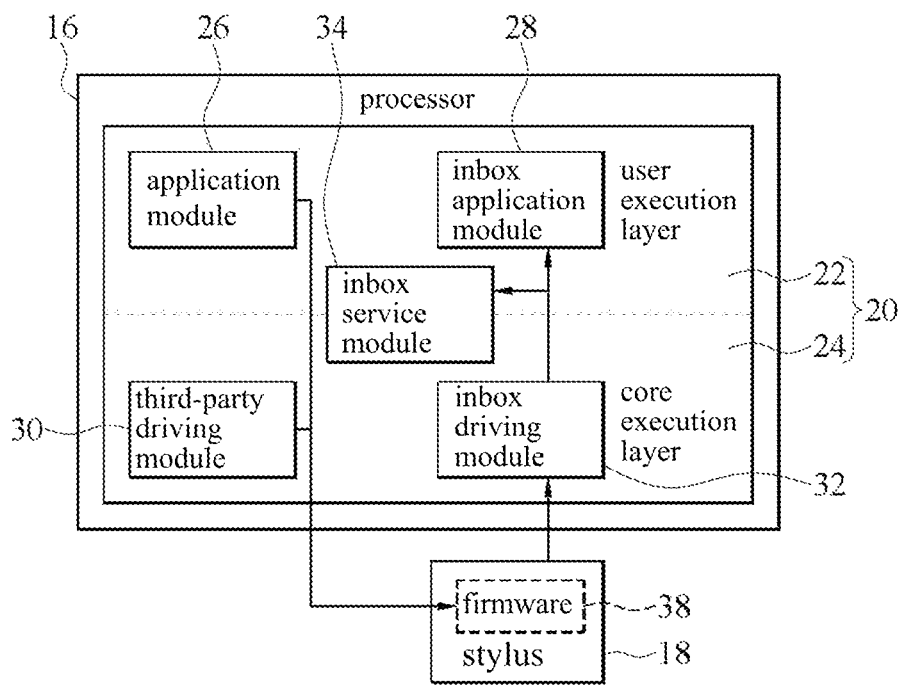
FIG. 4 is a schematic diagram of an inbox system architecture of a processor according to an embodiment.

To illustrate the execution flow of the operating system 20 based on the system architecture of the processor 16, please refer to FIG. 1, FIG. 3 and FIG. 4. The operating system 20 of the processor 16 includes a user execution layer 22 and a core execution layer 24. An application module 26 and an inbox application module 28 run in the user execution layer 22, a third-party driving module 30 and the inbox driving module 32 run in the core execution layer 24, an inbox service module 34 runs in the user execution layer 22 or the core execution layer 24, and a firmware 38 is installed un the stylus 18.

In one embodiment, the application module 26 is a third-party application, and the third-party driving module 30 is a third-party driver. When the stylus 18 is used with the electronic device 10, the application module 26 or the third-party driving module 30 generates the switching command, and transmits the switching command to the firmware 38 of the stylus 18. Then, the firmware 38 of the stylus 18 adjusts the coordinate range of the operation coordinate information from the first coordinate range corresponding to the entire display area 121 to the second coordinate range corresponding to the mapping display area 122 and generates updated operation coordinate information, and the mapping display area 122 has the same ratio as the effective input area 142. Then, the firmware 38 of the stylus 18 transmits the updated operation coordinate information to the inbox driving module 32, and the inbox driving module 32 controls the inbox application module 28 and the inbox service module 34 according to the updated operation coordinate information to define the mapping display area 122 corresponding to the effective input area 142.

Please refer to FIG. 2 and FIG. 3. In one embodiment, one of the two opposite side lengths of the mapping display area 122 with the same ratio as the effective input area 142 is equal to the a side length of the display area 121.

Please also refer to FIG. 3. In one embodiment, the mapping display area 122 is located at a preset position at the bottom of the display area 121. In other embodiments, the mapping display area 122 is adjusted to other positions in the display area 121 according to the requirements. Please refer to FIG. 1, FIG. 3 and FIG. 5 at the same time. In one embodiment, the processor 16 receives an adjustment command from the touch module 14, the stylus 18, or the keyboard 15, and moves the mapping display area 122 to a proper position in the display area 121 according to the adjustment command. In one embodiment, the adjustment command is generated by performing a gesture operation on the touch module 14, touching a function block on the touch module 14, pressing a button of the stylus 18, or pressing a function key or a combination key on the keyboard 15 of the electronic device 10. In detail, after the processor 16 receives the adjustment command, the processor 16 performs calculations according to the adjustment command, determines the direction of movement and calculates how much offset needs to be moved to generate an offset parameter, and transmits the adjustment information including an offset parameter to the stylus 18. When the stylus 18 is activated, the stylus 18 generates an adjusted operation coordinate information according to the offset parameter, and transmits the adjusted operation coordinate information to the processor 16 to adjust the position of the mapping display area 122, as shown in FIG. 5.

Figure 6:
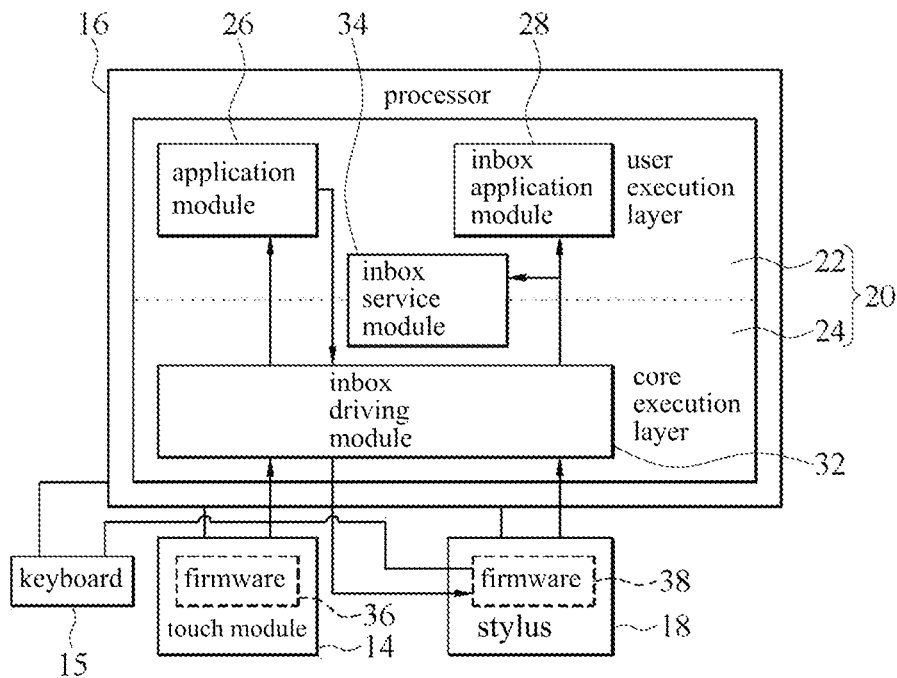
FIG. 6 is a schematic diagram of a system architecture of the processor during adjustment according to an embodiment.

From the above, as the adjustment of the mapping display area 122 on the display area 121 is executed by the operating system (OS) in the processor 16 cooperating with the firmware of the touch module 14 and the firmware of the stylus 18, the complete adjustment process is illustrated from the system architecture of the processor 16. Please refer to FIG. 1 and FIG. 6, in the operating system 20 of the processor 16, the application module 26 and the inbox application module 28 run in the user execution layer 22, and the inbox driving module 32 runs in the core execution layer 24, an inbox service module 34 runs in the user execution layer 22 or the core execution layer 24, the touch module 14 is installed with the firmware 36, and the stylus 18 is installed with the firmware 38.

In one embodiment, when the inbox driving module 32 receives the adjustment command from the touch module 14, the stylus 18 or the keyboard 15, and transmits the adjustment command to the application module 26, the application module 26 calculates the offset parameter according to the adjustment command, and transmits the adjustment information including the offset parameter to the firmware 38 of the stylus 18 through the inbox driving module 32. And then, the firmware 38 of the stylus 18 generates the adjusted operation coordinate information according to the operation coordinate information (that is, the updated operation coordinate information) of the stylus 18 and the offset parameter, and reports the adjusted operation coordinate information to the inbox driving module 32 of the operating system 20. Then, the inbox driving module 32 controls the inbox application module 28 and the inbox service module 34 to adjust the mapping display area 122 to an appropriate position according to the adjusted operation coordinate information.

Figure 5:
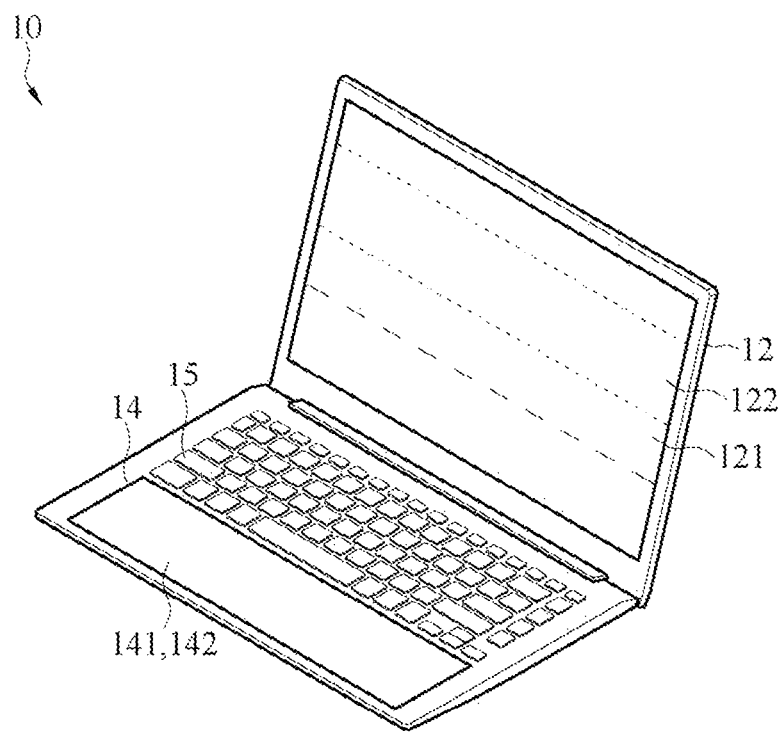
FIG. 5 is a schematic diagram of a display state of the electronic device after adjustment according to an embodiment.

Please refer to FIG. 1 and FIG. 5. In one embodiment, the processor 16 generates the adjustment command through the application, and transmits the adjustment command to the stylus 18. The stylus 18 transmits the operation coordinate information (ie, the updated operation coordinate information) to the processor 16 according to the adjustment command. The processor 16 generates the offset parameter according to the operation coordinate information (such as the updated operation coordinate information) and transmits the offset parameter to the stylus 18. The stylus 18 generates the adjusted operation coordinate information according to the offset parameter and the operation coordinate information (such as the updated operation coordinate information), and transmits the adjusted operation coordinate information to the processor 16 to adjust the mapping display area 122 to the proper position.

Figure 7:
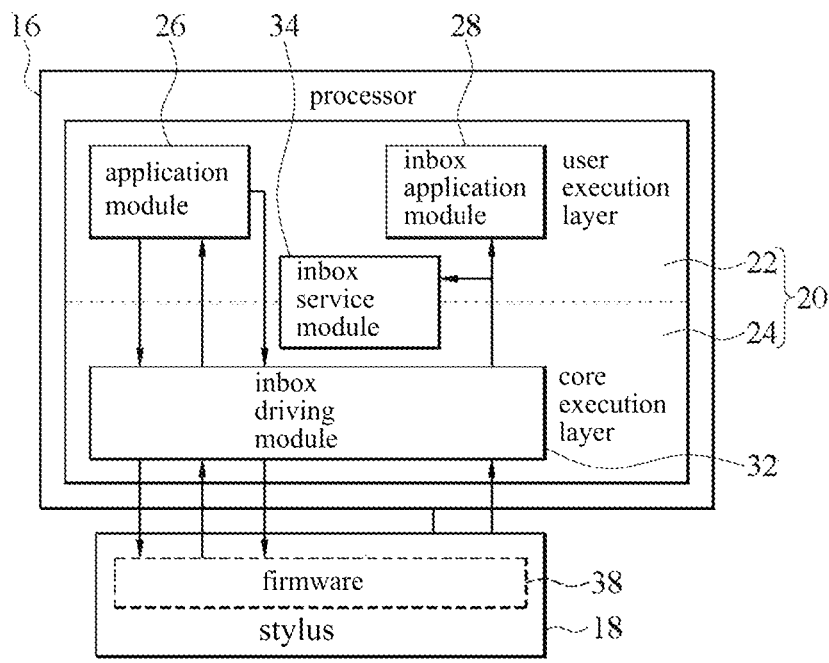
FIG. 7 is a schematic diagram of the system architecture of the processor during adjustment according to another embodiment.

Please refer to FIG. 1, FIG. 5 and FIG. 7, which illustrates an embodiment from the system architecture of the processor 16. The adjustment command is generated by the user executing the adjustment function in the application module 26. In the embodiment, the application module 26 generates the adjustment command and transmits it to the firmware 38 of the stylus 18 through the inbox driving module 32 to inform the stylus 18 to switch from a normal stylus mode to an adjustment mode. When the firmware 38 of the stylus 18 receives the adjustment command from the inbox driving module 32, it transmits the operation coordinate information (such as the updated operation coordinate information) to the inbox driving module 32 through the first transmission interface. Then the inbox driving module 32 transmits the operation coordinate information (such as the updated operation coordinate information) to the application module 26. Then, the application module 26 generates the offset parameter according to the updated operation coordinate information and transmits the offset parameter to the firmware 38 of the stylus 18 through the inbox driving module 32. In one embodiment, when the operation coordinate information (that is, the updated operation coordinate information) received by the application module 26 is that the stylus 18 moves from coordinates (0, 0) to coordinates (0, 3), then the displacement is calculated to be 3, and the offset parameter is set to 3 according to 3 of the displacement. Then, the firmware 38 of the stylus 18 generates the adjusted operation coordinate information according to the operation coordinate information (such as the updated operation coordinate information) and the offset parameter, and transmits the adjusted operation coordinate information to the inbox driving module 32 through the second transmission interface. Then, the inbox driving module 32 controls the inbox application module 28 and the inbox service module 34 according to the adjusted operation coordinate information to adjust the mapping display area 122 to a proper position. It should be noted that the firmware 38 of the stylus 18 transmits the operation coordinate information (that is, the updated operation coordinate information) to the inbox driving module 32 through a first transmission interface and transmits the adjusted operation coordinate information to the driving module 32 through a second transmission interface, and the first transmission interface is different from the second transmission interface.

Figure 8:
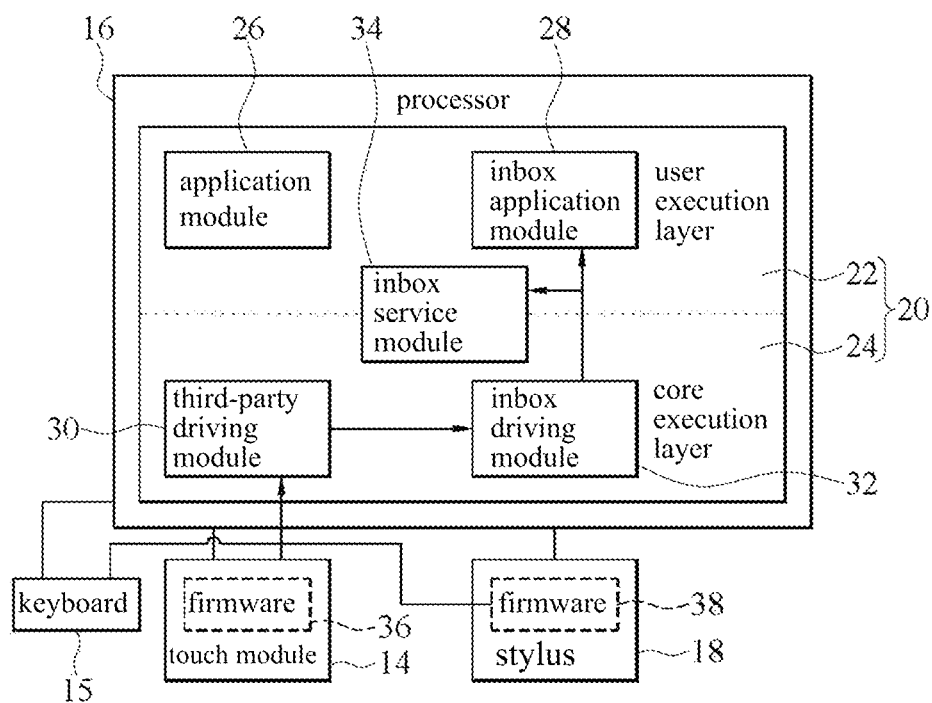
FIG. 8 is a schematic diagram of a system architecture of a processor during adjustment according to another embodiment.

In another embodiment, please refer to FIG. 1 and FIG. 5 at the same time. The processor 16 generates the offset parameter corresponding to the adjustment command, and stores the offset parameter in the processor 16. When the stylus 18 generates the operation coordinate information (such as the updated operation coordinate information) and transmits it to the processor 16, the processor 16 adjusts the mapping display area 122 to a proper position according to the offset parameter and the operation coordinate information (such as the updated operation coordinate information). From the system architecture of the processor 16, please refer to FIG. 1, FIG. 5 and FIG. 8. In the operating system 20 of the processor 16, when the third-party driving module 30 receives the adjustment command from the touch module 14, the stylus 18, or the keyboard 15, the third-party driving module 30 calculates and stores the offset parameter. When the user operates the stylus 18, the firmware 38 of the stylus 18 transmits adjustment information including the operation coordinate information (such as the updated operation coordinate information) to the third-party driving module 30, the third-party driving module 30 generates the adjusted operation coordinate information according to the offset parameter and the operation coordinate information (such as the updated operation coordinate information), and transmits the adjusted operation coordinate information to the inbox driving module 32. Then, the inbox driving module 32 controls the inbox application module 28 and the inbox service module 34 according to the adjusted operation coordinate information to adjust the mapping display area 122 to a proper position.

Figure 9:
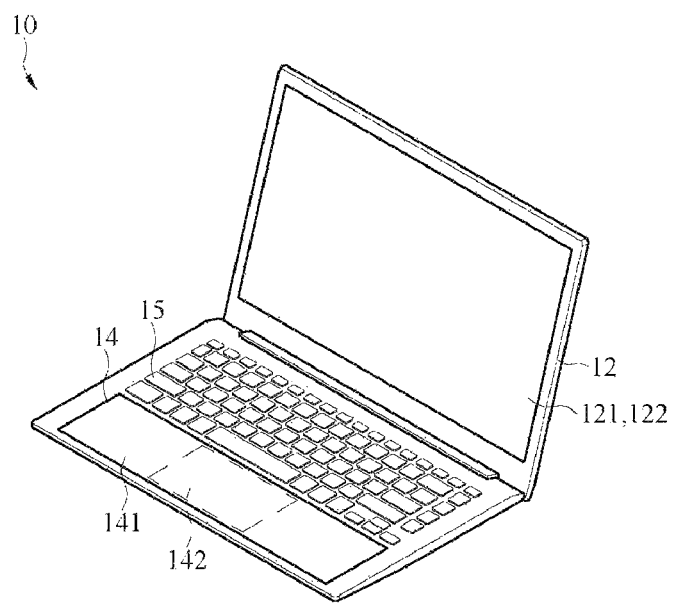
FIG. 9 is a schematic diagram of the display state of the electronic device corresponding to an effective input area according to an embodiment.
Figure 10:
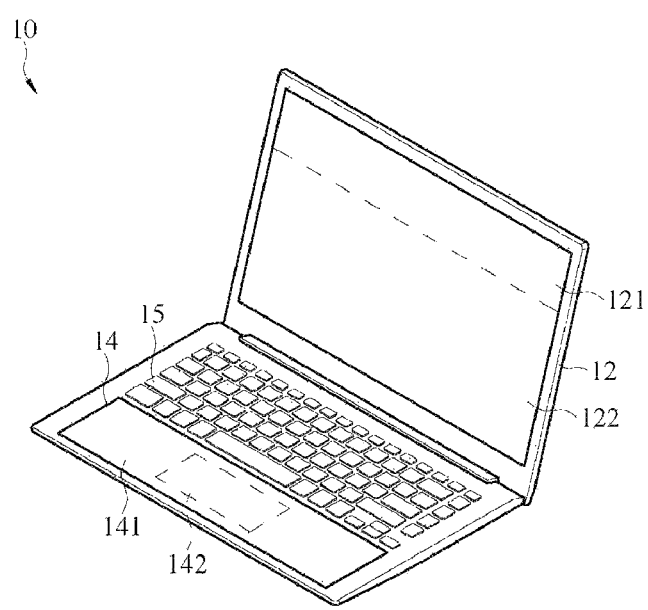
FIG. 10 is a schematic diagram of a display state of an electronic device corresponding to an effective input area according to another embodiment.
Figure 11:
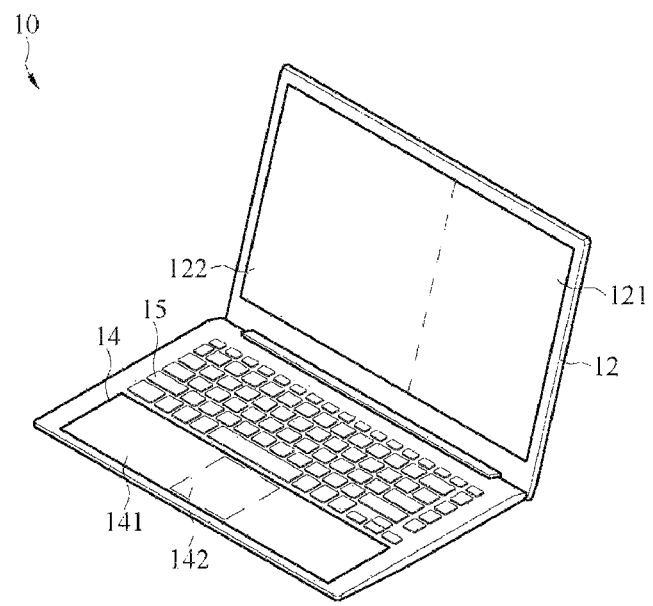
FIG. 11 is a schematic diagram of a display state of an electronic device corresponding to an effective input area according to further another embodiment.

Please refer to FIG. 1, and FIG. 9 to FIG. 11. In one embodiment, the processor 16 receives a setting request from the touch module 14, the stylus 18, or the keyboard 15, and defines the effective input area 142 according to the setting request. In one embodiment, when the user selects a range defined as the effective input area 142 in the touchable area 141 of the touch module 14 by a finger or the stylus 18, the touch module 14 generates setting range information including the size of the selected range and transmits the setting range information to the processor 16, and the processor 16 generates a size conversion coordinate information based on the setting the range information. Then, when the stylus 18 generates an operation coordinate information and transmits it to the processor 16, the processor 16 sets the mapping display area 122 corresponding to the effective input area 142 according to the operation coordinate information and the size conversion coordinate information. As shown in FIG. 9, in one embodiment, when the input ratio of the effective input area 142 is exactly equal to the aspect ratio of the display area 121, the mapping display area 122 is equivalent to the display area 121. As shown in FIG. 10 and FIG. 11, in one embodiment, when the input ratio of the effective input area 142 is not equal to the aspect ratio of the display area 121, the mapping display area 122 is mapped in proportion to the effective input area 142 in a part of the display area 121.

Please refer to FIG. 1 and FIG. 11. In one embodiment, when the user defines the effective input area 142, the processor 16 adjusts the position of the mapping display area 122 in the display area 121 according to the adjustment command received from the touch module 14, the stylus 18, or the keyboard 15. The adjustment method in this embodiment is similar to the foregoing embodiment, and the processor 16 generates an offset parameter corresponding to the adjustment command. In one embodiment, the processor 16 transmits the offset parameter to the stylus 18, and the stylus 18 generates an adjusted operation coordinate information corresponding to the offset parameter and transmits the adjusted operation coordinate information to the processor 16 to adjust the position of the mapping display area 122. In another embodiment, the processor 16 stores the offset parameter, and the processor 16 adjusts the mapping display area 122 to a proper position according to the offset parameter and the operation coordinate information when the stylus 18 generates the operation coordinate information and transmits it to the processor 16.

Therefore, the user adjusts the size and position of the mapping display area 122 through the custom settings to meet the needs of writing or drawing in different the mapping display area 122.

Figure 12:
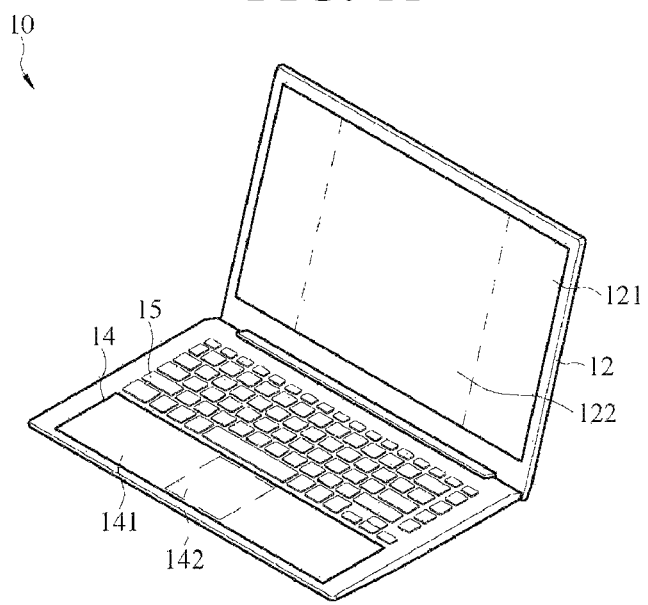
FIG. 12 is a schematic diagram of the display state of the electronic device after adjustment according to FIG. 11.
Figure 13:
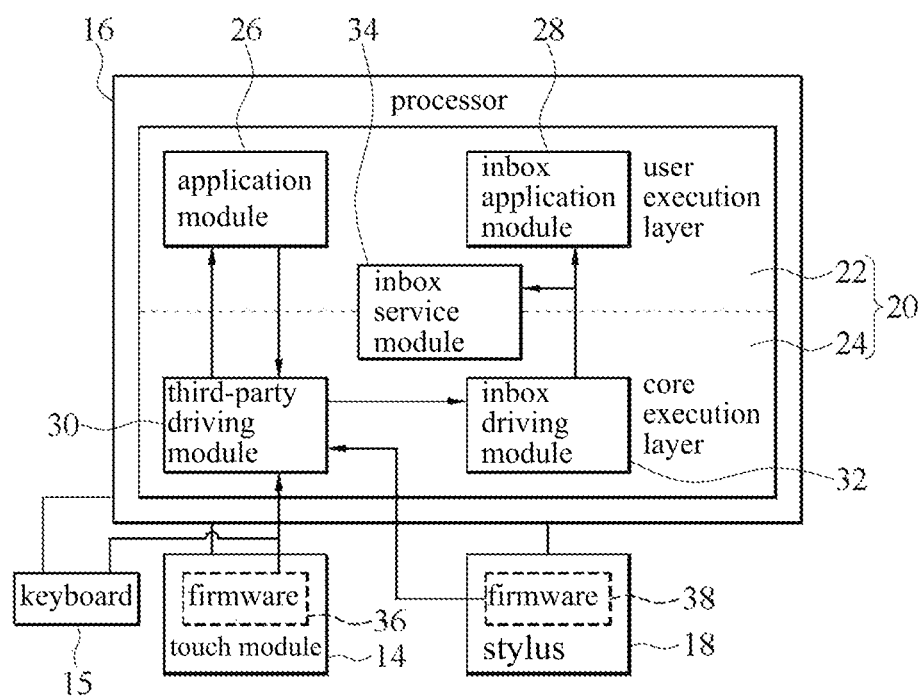
FIG. 13 is a schematic diagram of a system architecture of a processor during setting and adjustment according to an embodiment.

As shown in FIG. 12, adjusting the position of the mapping display area 122 in the display area 121 in relationship of the effective input area 142 is expressed by the following equations:

$$\vec{P_B} = P_B(X, Y)$$

$$\vec{P_B} = R(\vec{P_C} - \vec{P_{C0}}) + \vec{P_{B0}}$$

$$R = \min\left(\frac{B_{rx}}{C_{sx}}, \frac{B_{ry}}{C_{sy}}\right)$$

Wherein, R is the magnification ratio of the mapping display area 122, $\vec{P_B}$ is the position of the display area 121, $\vec{P_C}$ is the position of the touchable area 141, $\vec{P_{C0}}$ is the starting point of the effective input area 142, $\vec{P_{B0}}$ is the starting point of the mapping display area 122, ($B_{rx}$, $B_{ry}$) is the resolution of the display panel 12, and ($C_{sx}$, $C_{sy}$) is the logical resolution of the effective input area 142.

From the system architecture of the processor 16 to illustrate the customized the effective input area 142, please refer to FIG. 1 and FIG. 11 to FIG. 13. In the operating system 20 of the processor 16, the third-party driving module 30 receives the setting request from the touch module 14, the stylus 18, or the keyboard 15, and transmits the setting request to the application module 26, and then, the application module 26 calculates the size conversion coordinate information based on the position and size information of the range in the setting request, and transmits the size conversion coordinate information to the third-party driving module 30. When the stylus 18 is operated, the firmware 38 of the stylus 18 transmits the packet with the operation coordinate information (such as the original the operation coordinate information) to the third-party driving module 30. At this time, the third-party driving module 30 adjusts the operation coordinate information (that is, the original the operation coordinate information) according to the size conversion coordinate information to generate the updated operation coordinate information, and transmits the updated operation coordinate information to the inbox driving module 32. Then, the inbox driving module 32 controls the inbox application module 28 and the inbox service module 34 according to the updated operation coordinate information to complete the customized setting of the mapping display area 122.

Figure 14:
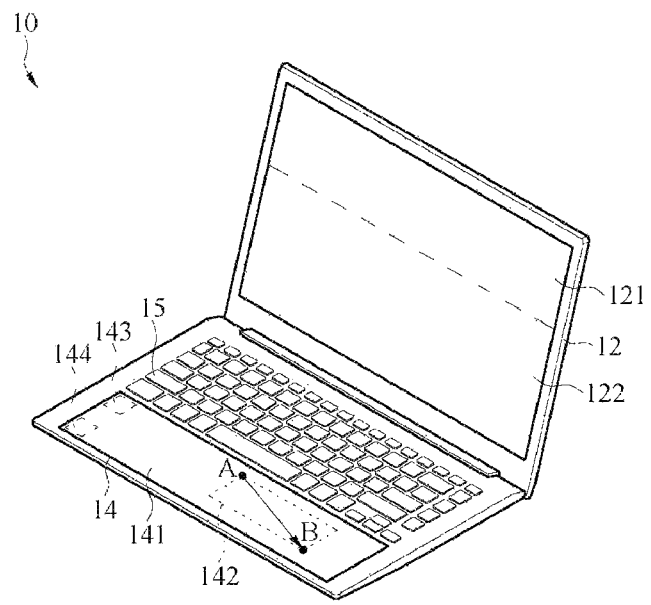
FIG. 14 is a schematic diagram of the electronic device in a setting state and an adjustment state according to an embodiment.

In one embodiment, it takes the touch module 14 as an example to illustrate how to use the touch module 14 to customize the setting and adjustment of the effective input area 142. Please refer to FIG. 1 and FIG. 14. A first functional block 143 and a second functional block 144 is set on the left side of the touchable area 141 of the touch module 14, to generate the setting request and the adjustment command, respectively. In one embodiment, when the first functional block 143 is long-pressed, a setting event is started, and the processor 16 enters the setting state of setting the effective input area 142 of the stylus 18. Then, when the stylus 18 slides directly from any predetermined starting point A to the end point B in the touchable area 141 and leaves the touchable area 141, the processor 16 temporarily records the rectangular area containing points A and B as the effective input area 142, and this step is repeated until a satisfactory rectangular block is selected. When a satisfactory rectangular block is selected, long-press the first functional block 143 again to end the setting event. The processor 16 receives the corresponding the setting request from the touch module 14 or the stylus 18 when the setting event ends, and sets the selected rectangular block to the effective according to the range information in the setting request input area 142.

Figure 15:
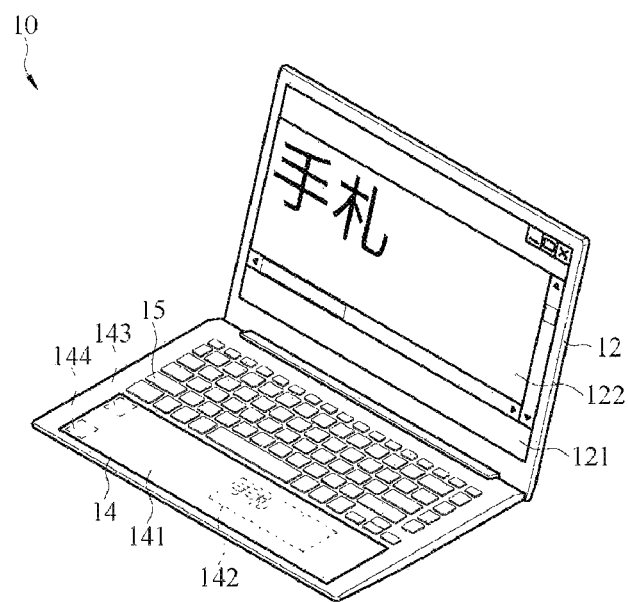
FIG. 15 is a schematic diagram of the electronic device after setting and adjustment according to an embodiment.

In one embodiment, when the second functional block 144 is long-pressed, an adjustment event is started, and the processor 16 enters the adjustment state of the mapping display area 122 at this time. Then, the user directly slides the finger left and right or slides up and down in the touchable area 141 to adjust the position of the mapping display area 122, and this step is repeated until it moves to the best position. When moving to the best position, long-press the second functional block 144 again to end the adjustment event. When the adjustment event is ended, the processor 16 receives the adjustment command from the touch module 14 or the stylus 18, and sets the position of the finger as the display position of the mapping display area 122 according to the adjustment command. As shown in FIG. 15, in one embodiment, when completing the setting of the effective input area 142 and the mapping display area 122, the text written by the stylus 18 in the effective input area 142 of the electronic device 10 is enlarged and displayed on the mapping display area 122. Therefore, it solves the distortion caused by the mapping problem of the touch ratio.

The foregoing embodiment takes the long-press input mode as an example. In other embodiments, the key input on the stylus, or the keyboard function key or combination key input, etc., is also used, which is not limited herein.

Consequently, in this disclosure, the optimal mapping relationship between the touch module and the display panel is established and adjusted according to the needs of users, and the size and position of the effective input area of the stylus in the touchable area of the touch module is customized, to solve the problem of proportional distortion, so that users will not feel uncomfortable.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, adapted with a stylus, the electronic device comprising:
    a display panel, including a display area;
    a touch module, including a touchable area; and
    a processor, electrically connected to the display panel and the touch module, the processor defines an effective input area responding to the operation of the stylus in the touchable area, and defines a mapping display area corresponding to the effective input area in the display area, and adjusts a display ratio of the mapping display area according to an input ratio of the effective input area, wherein the effective input area comprises a sub-region of the touchable area;
    wherein the input ratio is equal to the display ratio, the display ratio is an aspect ratio of the mapping display area and the input ratio is an aspect ratio of the effective input area.

2. The electronic device according to claim 1, wherein the touchable area is equal to the effective input area.

3. The electronic device according to claim 1, wherein at least one side length of the mapping display area is equal to a side length of the display area.

4. The electronic device according to claim 1, wherein the processor generates a switching command to the stylus, and the stylus adjusts the coordinate range of an operation coordinate information from corresponding to the display area to corresponding to the mapping display area.

5. The electronic device according to claim 1, wherein the processor further receives an adjustment command, and moves the mapping display area to a proper position in the display area according to the adjustment command.

6. The electronic device according to claim 5, wherein the processor generates an offset parameter corresponding to the adjustment command, and transmits the offset parameter to the stylus, and the stylus generates an adjusted operation coordinate information corresponding to the offset parameter, and transmits the adjusted operation coordinate information to the processor to adjust the mapping display area to the proper position.

7. The electronic device according to claim 6, wherein the adjustment command is generated the touch module, the stylus or a keyboard electrically connected to the processor.

8. The electronic device according to claim 5, wherein the processor generates and records an offset parameter corresponding to the adjustment command, and the processor adjusts the mapping display area to the appropriate position according to the offset parameter and the operation coordinate information when the stylus generates an operation coordinate information and transmits it to the processor.

9. The electronic device according to claim 8, wherein the adjustment command is generated the stylus, the touch module or a keyboard electrically connected to the processor.

10. The electronic device according to claim 1, wherein the processor further generates an adjustment command and transmits it to the stylus and the stylus transmits an operation coordinate information to the processor according to the adjustment command, the processor generates an offset parameter according to the operation coordinate information and transmits it to the stylus, and the stylus generates an adjusted operation coordinate information according to the offset parameter and the operation coordinate information, and transmits the adjusted operation coordinate information to the processor to adjust the mapping display area to an appropriate position in the display area.

11. The electronic device according to claim 1, wherein the processor further receives a setting request, and defines the effective input area according to the setting request.

12. The electronic device according to claim 11, wherein the processor selects a range in the touchable area to define as the effective input area by the touch module or the stylus when receiving the setting request and generates a size conversion coordinate information according to the size of the range, when the stylus generates an operation coordinate information transmits it to the processor, and the processor sets the mapping display area corresponding to the effective input area according to the operation coordinate information and the size conversion coordinate information.

13. The electronic device according to claim 12, wherein the processor also receives an adjustment command, and adjusts the position of the mapping display area in the display area according to the adjustment command.

14. The electronic device according to claim 13, wherein the setting request and the adjustment command are generated the stylus, the touch module, or a keyboard that electrically connected to the processor.

* * * * *